US012568121B1

(12) United States Patent
McLarnon

(10) Patent No.: US 12,568,121 B1
(45) Date of Patent: Mar. 3, 2026

(54) GENERATING CONFIGURATION CHANGE EVENT STREAM FOR EVENT-DRIVEN ASSESSMENT OF RESOURCES

(71) Applicant: Rapid7, Inc., Boston, MA (US)

(72) Inventor: Barry McLarnon, Lisburn (GB)

(73) Assignee: Rapid7, Inc., Boston, MA (US)

( * ) Notice: Subject to any disclaimer, the term of this patent is extended or adjusted under 35 U.S.C. 154(b) by 23 days.

(21) Appl. No.: 18/809,488

(22) Filed: Aug. 20, 2024

(51) Int. Cl.
*H04L 9/40* (2022.01)
(52) U.S. Cl.
CPC .......... *H04L 63/20* (2013.01); *H04L 63/1408* (2013.01)
(58) Field of Classification Search
CPC ........................... H04L 63/20; H04L 63/1408
See application file for complete search history.

(56) References Cited

U.S. PATENT DOCUMENTS

| | | |
|---|---|---|
| 10,541,891 B2 | 1/2020 | Ngoo et al. |
| 10,680,889 B2 | 6/2020 | Vasseur et al. |
| 11,304,060 B2 | 4/2022 | Xu et al. |
| 2021/0049127 A1* | 2/2021 | Kunchakarra ...... G06F 11/3688 |
| 2025/0175473 A1* | 5/2025 | Shaw .................... H04L 63/145 |

* cited by examiner

*Primary Examiner* — Huan V Doan
(74) *Attorney, Agent, or Firm* — Ashwin Anand

(57) ABSTRACT

A configuration change assessment pipeline is disclosed, executable to assess a continuous stream of resource configuration changes in a cloud-based computer network for security policy violations. In embodiments, the system executes assessment nodes that are configurable to monitor the input stream for specific change events, identify a set of related resources that should be assessed as result of a change event, perform various assessments on the related resources, and write assessment findings to an output stream. Action nodes are configured to consume the output stream and perform responsive actions such as generating user notifications and initiating automated remediation steps. Advantageously, the disclosed system is able to perform ad hoc assessments of a small set of relevant resources in response to specific change events in the network, so that security policy violations can be identified much more quickly.

20 Claims, 9 Drawing Sheets

Execute data collection agent(s) in a computer network to collect configuration states of resources in the computer network
810

Store, in a database, successive configuration states of the resources over time
820

Receive, from the agent(s) in the computer network, a new configuration state of a resource
830

Generate a first hash value of the new configuration state and a second hash value of an old configuration state of the resource stored in the database
840

Compare the first and second hash values to determine that the resource has experienced a configuration change
850

Add, to an event stream, a change event indicating the configuration change, including the resource that experienced the configuration change, a time of the configuration change, the old configuration state, and the new configuration state
860

Execute a pool of assessment nodes to monitor the event stream
720 network monitoring service
120

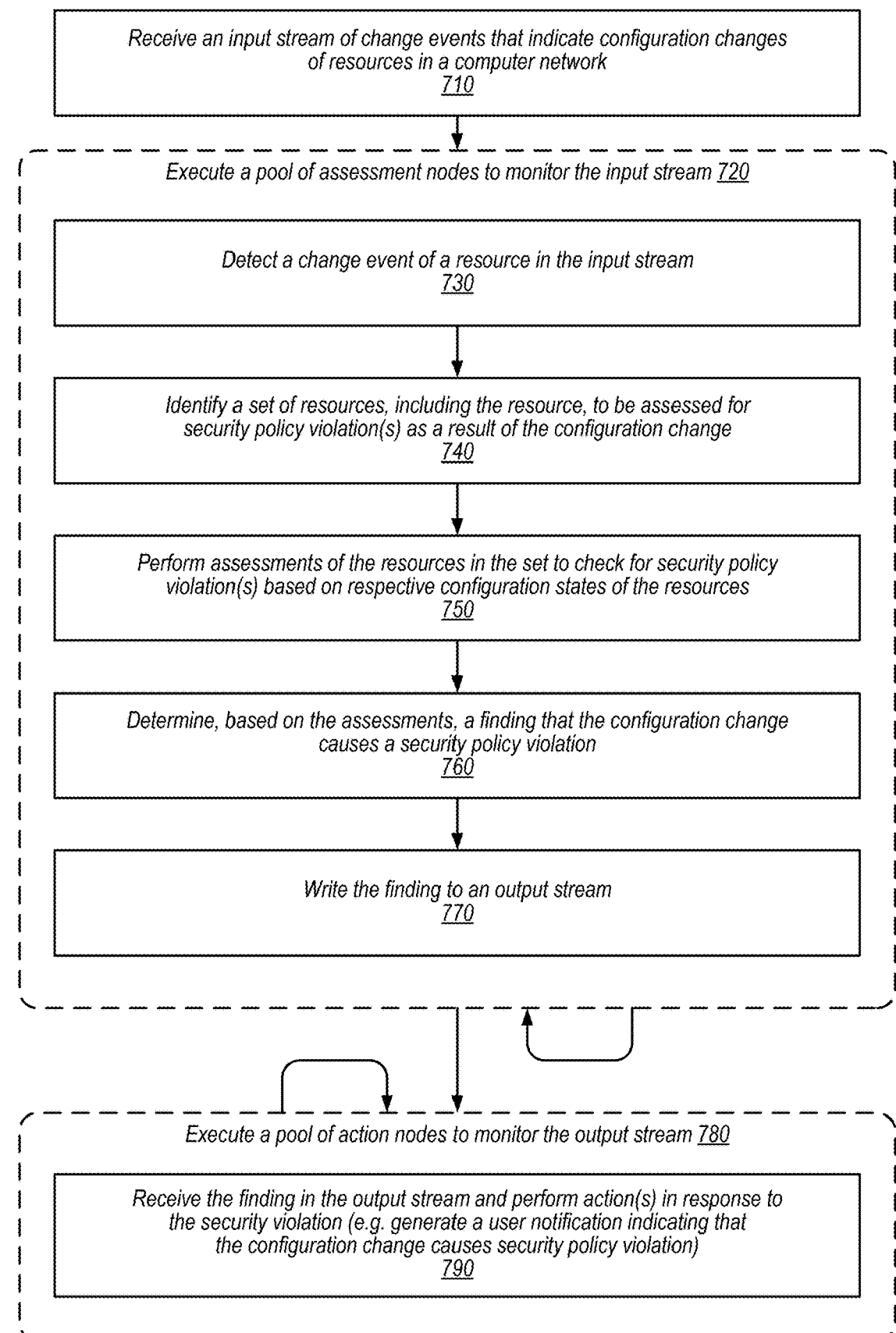

Receive an input stream of change events that indicate configuration changes
of resources in a computer network
710

Execute a pool of assessment nodes to monitor the input stream 720

Detect a change event of a resource in the input stream
730

Identify a set of resources, including the resource, to be assessed for
security policy violation(s) as a result of the configuration change
740

Perform assessments of the resources in the set to check for security policy
violation(s) based on respective configuration states of the resources
750

Determine, based on the assessments, a finding that the configuration change
causes a security policy violation
760

Write the finding to an output stream
770

Execute a pool of action nodes to monitor the output stream 780

Receive the finding in the output stream and perform action(s) in response to
the security violation (e.g. generate a user notification indicating that
the configuration change causes security policy violation)
790

FIG. 7

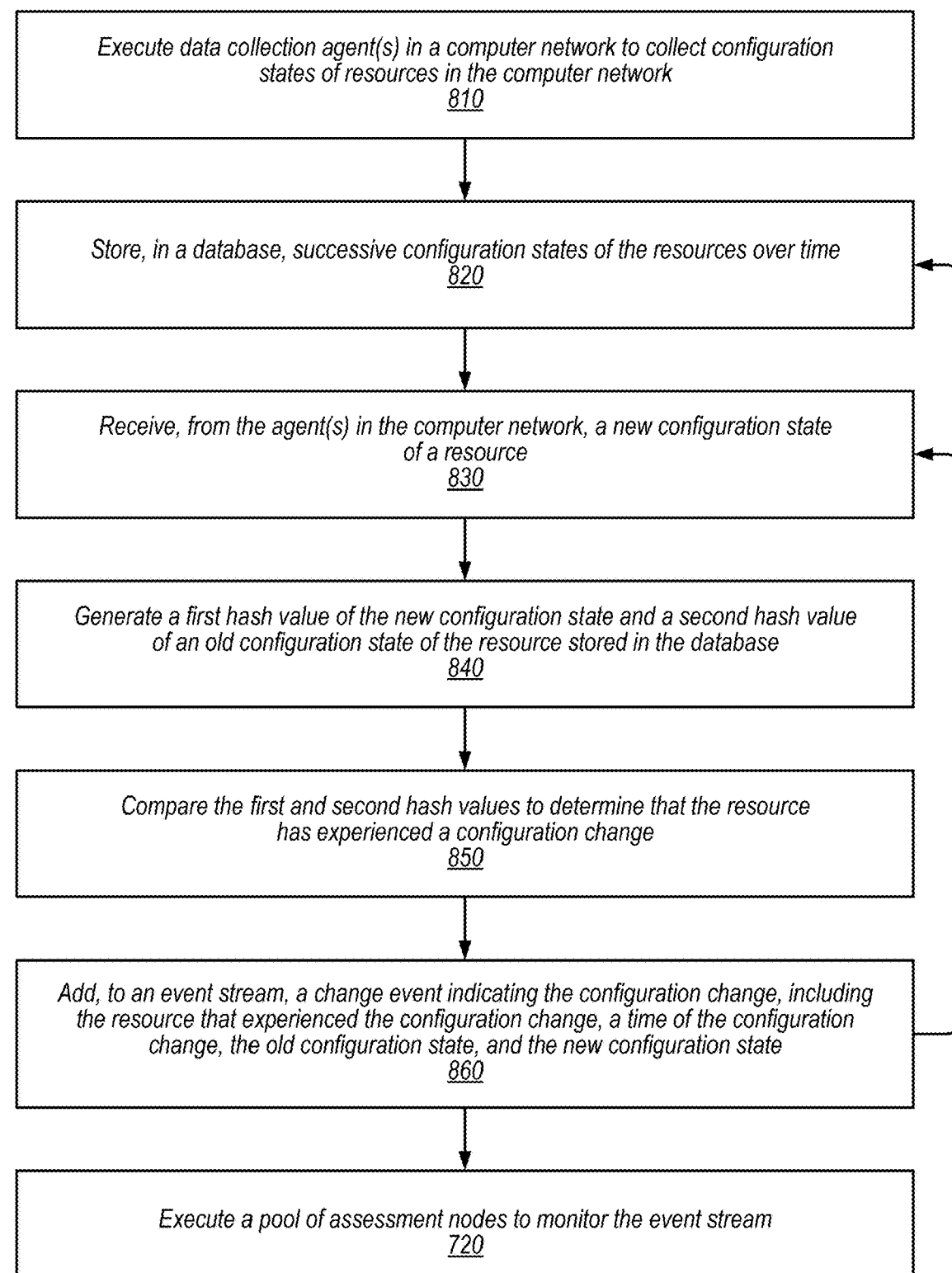

Execute data collection agent(s) in a computer network to collect configuration states of resources in the computer network
810

Store, in a database, successive configuration states of the resources over time
820

Receive, from the agent(s) in the computer network, a new configuration state of a resource
830

Generate a first hash value of the new configuration state and a second hash value of an old configuration state of the resource stored in the database
840

Compare the first and second hash values to determine that the resource has experienced a configuration change
850

Add, to an event stream, a change event indicating the configuration change, including the resource that experienced the configuration change, a time of the configuration change, the old configuration state, and the new configuration state
860

Execute a pool of assessment nodes to monitor the event stream
720

*FIG. 8*

GENERATING CONFIGURATION CHANGE EVENT STREAM FOR EVENT-DRIVEN ASSESSMENT OF RESOURCES

BACKGROUND

Cloud service providers provide dynamically scalable computing resources in networked environments. Such resources are often virtualized and delivered as a service over the Internet on a subscription basis. For example, customers of cloud services can rent the capacity provided by one or more servers simply by instantiating virtual machine instances in the cloud via a web console. Users need not have particular expertise about the specific hardware or software resources provided, or how the resources are provisioned when they order capacity. Cloud computing infrastructures typically provide services through data centers that operate physical servers with different levels of virtualization technologies.

In recent years, third-party network monitoring services have been increasingly used to monitor virtual resources deployed in the cloud. A monitoring service may periodically harvest resource metadata from cloud service provider systems and review the metadata to identify compliance violations or potential security risks caused by misconfigurations, vulnerabilities, or insufficiently rigorous security practices. However, the monitoring process can be inefficient because the service does not differentiate between resources that have changed and resources that have not changed since the last assessment. Some resources that are highly volatile require more frequent assessments, while others that are updated only rarely do not need to be monitored as closely. Routine assessments of the entire network generate a substantial amount of unnecessary work during each assessment cycle, especially for larger networks. As a result, users of these monitoring services must provision ever-increasing amounts of monitoring resources to keep up with their growing networks. Additionally, because these services are designed to perform network assessments on a periodic basis, they do not report issues in the network immediately, so problems can persist and grow in the network for an unacceptably long period of time before being reported.

BRIEF DESCRIPTION OF THE DRAWINGS

FIG. 7 is a flowchart illustrating the operations of the CCAP to assess configuration changes in a monitored network and perform responsive actions, according to some embodiments.

FIG. 8 is a flowchart illustrating a process of generating an input stream for the CCAP using data in a resource configuration database, according to some embodiments.

Figure 1:
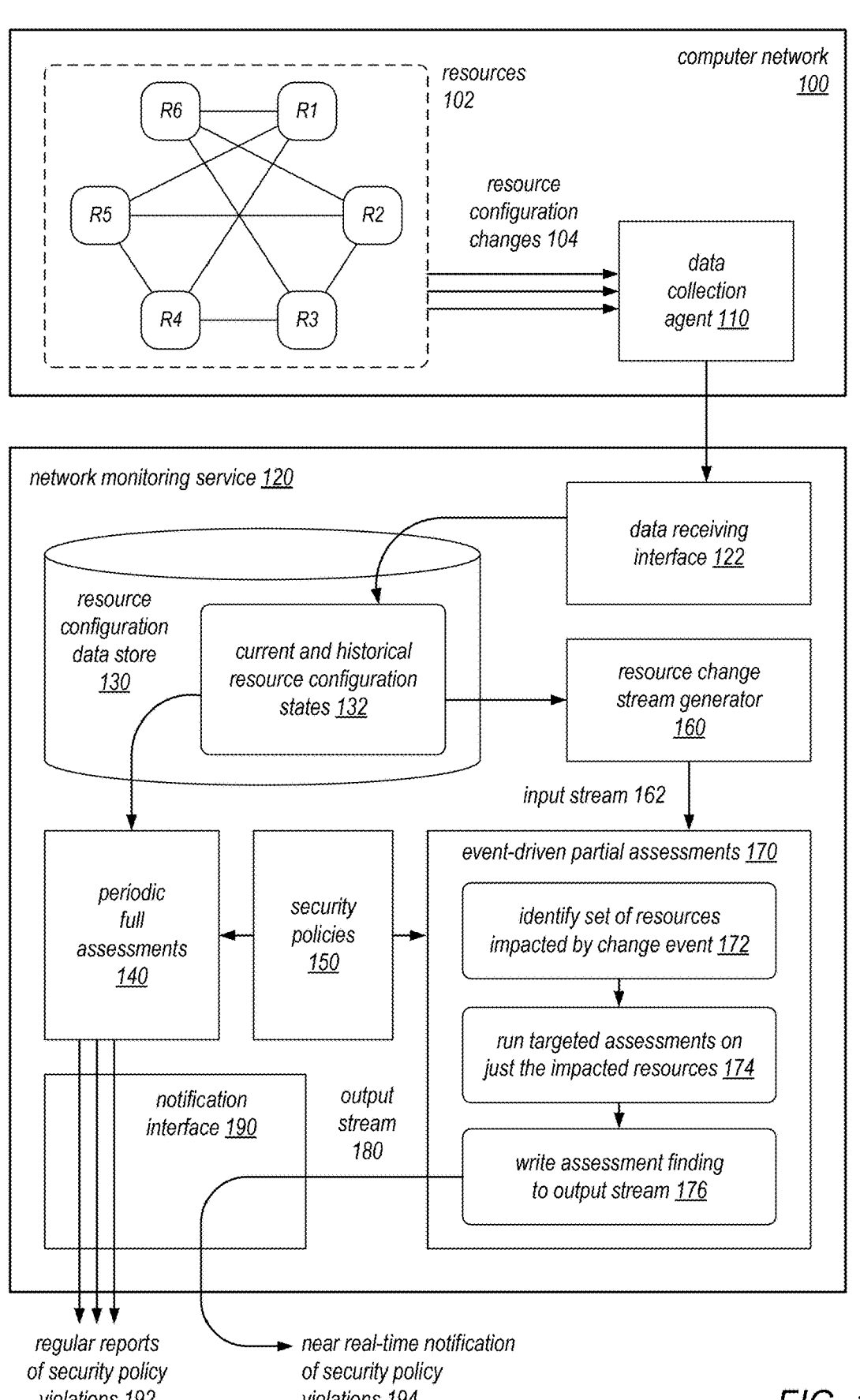
FIG. 1 is a block diagram illustrating a network monitoring service that implements event-driven partial assessments of a network based on an input stream of configuration change events, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Network monitoring services have become increasingly used to monitor virtual resources deployed on cloud provider networks. These services monitor for network conditions such as security vulnerabilities and network policy violations and report these conditions to human analysts in the form of alerts. The monitoring services are typically implemented as management processes that poll for data concerning the status of managed components in the cloud environment, such as virtual machine instances. A monitoring service may asynchronously gather (harvest) cloud resource configuration data from the cloud environment using a provided credential by making calls to the reporting APIs of the cloud service provider. Periodically, the collected resource metadata is assessed for known security risks and/or security policy violations, based on the observed resource configurations.

However, network monitoring services can be inefficient as they do not generally differentiate between resources that have changed and those that have not changed since the last assessment. Some resources are highly volatile so that more frequency assessments are needed, while others are updated only rarely so that they do not need to be monitored as closely. Routine wholesale assessments of the entire network generate a substantial amount of unnecessary work in each assessment cycle, especially for larger networks. Moreover, some monitoring services also allow users to execute on-demand assessments that are performed just-in-time, which can add further load to the system. As a result, users of these monitoring services must deploy ever-increasing amounts of storage and infrastructure resources to keep up with their growing networks. Another problem with these monitoring services is that, depending on the configured schedule of the assessments, problems can persist and grow in the network for an unacceptably long period of time before being reported.

To address these and other problems in state-of-the-art network monitoring systems, this disclosure describes embodiments of a configuration change assessment pipeline (CCAP) in a network monitoring service, capable of monitoring a continuous stream of resource configuration changes in a cloud-based computer network and assess the changes for security policy violations in near-real time. In some embodiments, the system executes a pool of assessment nodes that monitor the input stream for specific types of configuration change events. When a change event of interest is observed in the input stream, the system identifies a set of related resources that needs to be reassessed as result of the change event, and responsively performs the assessments on the related resources to determine security risks or policy violations. The assessment node then writes the assessment findings to an output stream. The output stream may be consumed by a variety of downstream listeners, including action nodes configured to perform responsive actions to generate user notifications and initiate automated remediation steps.

Advantageously, the disclosed system is able to perform ad hoc assessments of small sets of relevant resources whenever configuration changes occur in the network, so that a security policy violation caused by a change can be identified and reported much more quickly (e.g. within minutes). Because the ad hoc assessments are performed at different times and only on a limited set of resources in the network impacted by a change event, these assessments do not generate load spikes in the network monitoring service. The limited assessments can be performed using a fraction of the service resources as compared to a full assessment of the network, and completed in a shorter amount of time. In some embodiments, the faster reporting may be enabled for certain highly volatile resources in the network, in addition to the normal full assessments of the network performed periodically (e.g. daily).

In some embodiments, the CCAP is configured to leverage event-based metadata reporting services provided by the cloud service provider. An event-based metadata reporting service may provide an API that allows registered listeners to receive configuration changes as events, allowing the listener to be triggered when specific types of changes occur in the cloud environment. Examples of event-based metadata reporting services include AWS CLOUDWATCH (accessible through AWS EVENTBRIDGE) and AZURE MONITOR (accessible through AZURE EVENT GRID). In some embodiments, the event-based metadata reporting service may be used to generate the input stream used by the CCAP, so that the input stream consists of events generated by these reporting services. In other embodiments, the CCAP may build the input stream itself using data collected from the cloud environment. For example, the CCAP may rely on a data collection agent deployed in the cloud environment to harvest configuration state data, either periodically or on an event-driven basis. The harvested data is then sent back to the CCAP environment and stored in a configuration state data repository, where the data is used by another CCAP component to asynchronously build the input stream. The later approach decouples the CCAP stream format from the reporting schema of the cloud provider reporting services, so that the CCAP can be easily adapted to work with multiple types of cloud service.

In some embodiments, the CCAP may implement a pool of assessment nodes to monitor the input stream for different types of change events. The assessment nodes may be independently-executing compute instances such as virtual machines, containers, and the like. In some embodiments, the assessment nodes may be implemented as parallel processes or threads. When a change event of interest is observed by an assessment node, the assessment node will perform an assessment of the affected resource indicated by the change event, to determine whether any security rules are violated as a result of the change. Additionally, the assessor node may identify a larger set of related resources that will be assessed along with the changed resource indicated by the change event. The related resources may be determined based on a set of security rules associated with the security risk being assessed.

As an example, a security policy may prohibit certain virtual machines in the cloud environment from having an open port that is accessible from the Internet. When a change event of a virtual machine is observed to cause a reassessment of this type of risk, the assessment node will perform a first assessment to check whether the virtual machine is running a process that is listening on an open port, a second assessment to check the attached network interfaces on the virtual machine for a publicly-accessible IP address, and a third assessment to check the access control lists of any networks or subnets associated with the network interfaces to determine if they are publicly accessible. The findings of all these assessments are then combined to determine whether the security risk is realized as a result of the change. The assessment findings generated by the assessment nodes are placed in an output stream of the CCAP, which may be consumed by a pool of action nodes. In this manner, the CCAP provides an end-to-end stream-based monitoring solution that can respond to configuration changes in the cloud environment substantially in real time, allowing security analysts to respond to problematic changes in the network as soon as they occur.

As will be appreciated by those skilled in the art, the disclosed CCAP system improves the functioning of current computer systems that implement network monitoring services, to reduce detection time for problematic network changes and the amount of data collection and assessment resources needed to monitor the network. The disclosed features represent a practical application of computer technology to achieve real-world benefits in real-world systems and processes, and are not intended to capture any bare mental processes, pure mathematical concepts or formulae, methods of organizing human activity, fundamental economic practices, or other types of abstract subject matter not eligible for patenting. These and other features and benefits of the CCAP system are described in further detail below in connection with the figures.

FIG. 1 is a block diagram illustrating a network monitoring service 120 that implements periodic full assessments and event-driven partial assessments of a network 100 based on an input stream 162 of configuration change events, according to some embodiments.

As shown, FIG. 1 depicts a computer network 100 that is being monitored by the network monitoring service 120. In some embodiments, the network monitoring service 120 may be operated by a third-party service provider company that is contracted to monitor the computer network 100 for security vulnerabilities, compliance violations, configuration errors, anomalies, or signs of cyberattacks. In some embodiments, the monitoring service provider may operate a managed detection and response (MDR) service, where human analysts located at a security operations center (SOC) are continuously monitoring client networks for alerts generated by the network monitoring service. The network monitoring service 120 may be part of a security information and event management (SIEM) system that is configured to harvest security-related data from client networks and perform different types of security assessments of the client networks according to configured security policies.

In some embodiments, the computer network 100 may be a virtual network of virtual resources provisioned in a cloud environment implemented on a cloud service provider network such as AMAZON WEB SERVICES (AWS), MICROSOFT AZURE, GOOGLE CLOUD, and the like. The resources 102 shown in the figure (R1 to R6) is a set of instantiated virtual resources running in the computer network 100. These resources 102 may include virtual machine instances, container and container orchestration resources, physical (e.g. bare metal servers), networking devices (e.g. virtual routers or firewall devices), virtual network interfaces, virtual networks and subnets, data storage resources, database management resources, artificial intelligence (AI) service resources and other types of configuration elements (e.g. access control lists). The types of resources recognized by the network monitoring service 120 may be defined according to a data schema of the network monitoring service.

As shown, in some embodiments, the network monitoring service 120 may interface with a set of data collection agents 110 deployed in the computer network 100. In some embodiments, the collection agents may be located outside the computer network 100, for example, in the same network as the network monitoring service 120. The data collection agents 110 may execute as authenticated user processes in the network to collect resource configuration data in the computer network 100 and/or changes in configuration state 104. The collected information is reported to a data receiving interface 122 of the network monitoring service 120. The collected configuration data 104 may include different types of security-related data monitored by the network monitoring service 120, such as resource permissions, user permissions, resource operating states and metrics, resource lifecycle events (e.g. resource creation and termination), etc. Depending on the embodiment, the collections may occur periodically according to a specified schedule, or triggered by certain events in the network 100. The collected data may be reported to the network monitoring service over a wide area network (WAN) such as the Internet, and may be encrypted or otherwise protected using a secure communication protocol such as a Transport Layer Security (TLS)-based protocol. In some embodiments, collected data may not be transmitted over a WAN. For example, the computer network 100 may be a first virtual private network (VPC) hosted on a cloud data center, and the network monitoring service 120 also executes within the cloud data center (or another cloud data center in the same region), so the data collection can occur over smaller private networks.

In some embodiments, the data receiving interface 122 may be implemented using a pool of data receiving components that are configured to asynchronously receive data from the data collection agents 110. The data receiving interface components 122 may be configured to perform two-way communication with the data collection agents 110, for example, to transmit instructions or configuration data to the agents 110. In some embodiments, the data receiving interface components 122 may be configured to unpack the received data from the data collection agents and write the received data into a resource configuration data store 130 of the network monitoring service 120. In some embodiments, collected data for different computer networks 100 may be stored in separate database instances in the resource configuration data store 130, so that data for different networks are kept isolated for security and privacy reasons.

As shown, in some embodiments, the network monitoring service 120 may store successive configuration states of the computer network 100, so that the stored data 132 includes both the current configuration state of the network 100 and historical configuration states of the network. In some embodiments, the data 132 is stored in a series of full snapshots of the network configuration state. In other embodiments, the data 132 is stored in a differential form (e.g. as a log of configuration changes), so that the current state or historical states can be reconstructed from the log.

As shown, in some embodiments, the network monitoring service 120 is configured to perform periodic full assessments 140 of the computer network 100. In a full assessment, the service will run a comprehensive set of assessments (e.g. queries on the data 132) to evaluate the network configuration state for security policy violations against a set of security policies 150. The full assessment may be repeated according to a set schedule (e.g. once a day), and any violations or security issues discovered by the full assessment are reported via a notification interface 190 as regular reports 192. The notification interface 190 may be a user interface (e.g. a GUI, email, or instant messaging interface) that presents alerts to users. In response to the reports 192, the users can investigate these alerts as necessary or take action to remediate security problems detected by the network monitoring service.

As discussed previously, these periodic full assessments 140 can be problematic for the network monitoring service in a number of ways. First, running full assessments of the entire network 100 can be resource intensive (especially for large networks), causing sharp resource usage spikes in the monitoring service 120. The size of the spike can grow in proportion to the size of the monitored network 100, so that monitor costs can quickly become prohibitive. Second, depending on the length of the assessment period, a periodic report 192 can include a large number of security issues, which can overwhelm human analysts and lead to long response times. Third, the periodic assessments may be too frequent for some types of resources (e.g. resources that rarely change) and not sufficiently frequent for other types of resources (e.g. resources that change frequently or are critical to network security). Thus, service resources are wasted for needless assessments of some types of network resources. At the same time, a service may not be able to report security violations for other types of resources in the network quickly enough, so that an underlying security issue is allowed to persist and develop for a full reporting period before being reported.

Accordingly, to address these issues with the periodic full assessments 140, embodiments of the network monitoring service 120 implements a set of event-driven partial assessments 170, which are used to perform ad hoc assessments on a limited set of changing network resources more quickly, in response to detected configuration changes of the resources. In some embodiments, these partial assessments 170 are triggered by resource change events observed in an input stream 162, which is generated by a resource change stream generator 160. Because these partial assessments 170 are spread out over time as resource changes occur, they do not contribute to large resource usage spikes in the network monitoring service 120. Slow-changing resources in the network trigger assessment only when the change, so that they are not needlessly reassessed as part of the periodic full assessments 140. On the other hand, fast-changing resources in the network can be monitored more closely, allowing for immediate detection and reporting whenever a change in the network occurs.

In some embodiments, the input stream 160 used by the event-driven partial assessments 170 is generated from the same data 132 stored in the resource configuration data store 130 that is used by the periodic full assessments 140. The resource change stream generator 160 may poll or listen to the data store 130 for changes, and whenever a change is detected, generate a change event in the input stream 162. In some embodiments, the resource change stream generator 160 will poll for changes in the data store 130 at a higher frequency (e.g. once an hour) than the periodic full assessments 140 (e.g. once a day), so that the partial assessments can be performed faster than the full assessments. In some embodiments, the resource change stream generator 160 may be configurable to generate change events for only a subset of the resources 100 in the network, leaving assessment of other resources to the periodic full assessments. Thus, in some embodiments, the two types of assessments 140 and 170 are employed alongside one another to monitor the network 100 in parallel.

In some embodiments, the partial assessment components 170 may consume the input stream 162 to watch for change events of interest in the network 100. When a particular change event of interest is observed, an assessment component may perform a limited assessment of the network by performing a sequence of tasks 172, 174, and 176.

At operation 172, the assessment component identifies a set of resources that are impacted by the change event. The set of resources may include the changed resource(s) identified by the change event, as well as an additional set of related resources that should be reassessed along with the changed resource(s). The assessment scope of the partial assessment may be determined according to explicit rules. For example, in some embodiments, the partial assessment system may first identify a set of security rules in the security policies 150 that are associated with the change resource(s) in the change event. Then, any related resources that are specified as part of the identified security rules are added to the set of related resources to be reassessed.

At operation 174, the assessment component runs targeted assessments on the set of related or impacted resources. In some embodiments, an individual assessment may involve executing a set of specified queries on the configuration state data 132 stored in the configuration data store 130. The queries may be formulated to return a Boolean result, so that a policy violation is indicated as a true or a false. In some embodiments, the results of operation 174 may cause more resources to be added to the set of related resources determined in operation 172, so that these two operations will be repeated until all resources impacted by the change event are appropriately assessed. In some embodiments, the results of all assessment queries are logically combined to determine an assessment finding for the change event, and the finding is written 178 to an output stream 180.

In some embodiments, the output stream 180 is consumed by downstream components that are configured to implement a variety of actions in response to the assessment findings. For example, one type of action may be to generate an alert notification via the notification interface 190 of the service 120. Because the assessment findings in the output stream 180 are generated in response to configuration changes in the network 100, the output stream can be used to generate security policy notifications 194 more quickly than the periodic full assessments 140. In some embodiments, the notifications 194 generated from the output stream 180 are real-time or near real-time notifications following a configuration change in the network, for example, reported in a matter of minutes or seconds. In some embodiments, certain consumers of the output stream 180 may be configured to implement real-time remediation actions in response to configuration changes in the network, for example, to revert an illegal configuration change. In some embodiments, the event-driven partial assessments 170 may be performed fast enough so that a requested configuration change in the network can be proactively blocked with a warning that the attempted change will violate a security policy 150.

Figure 2:
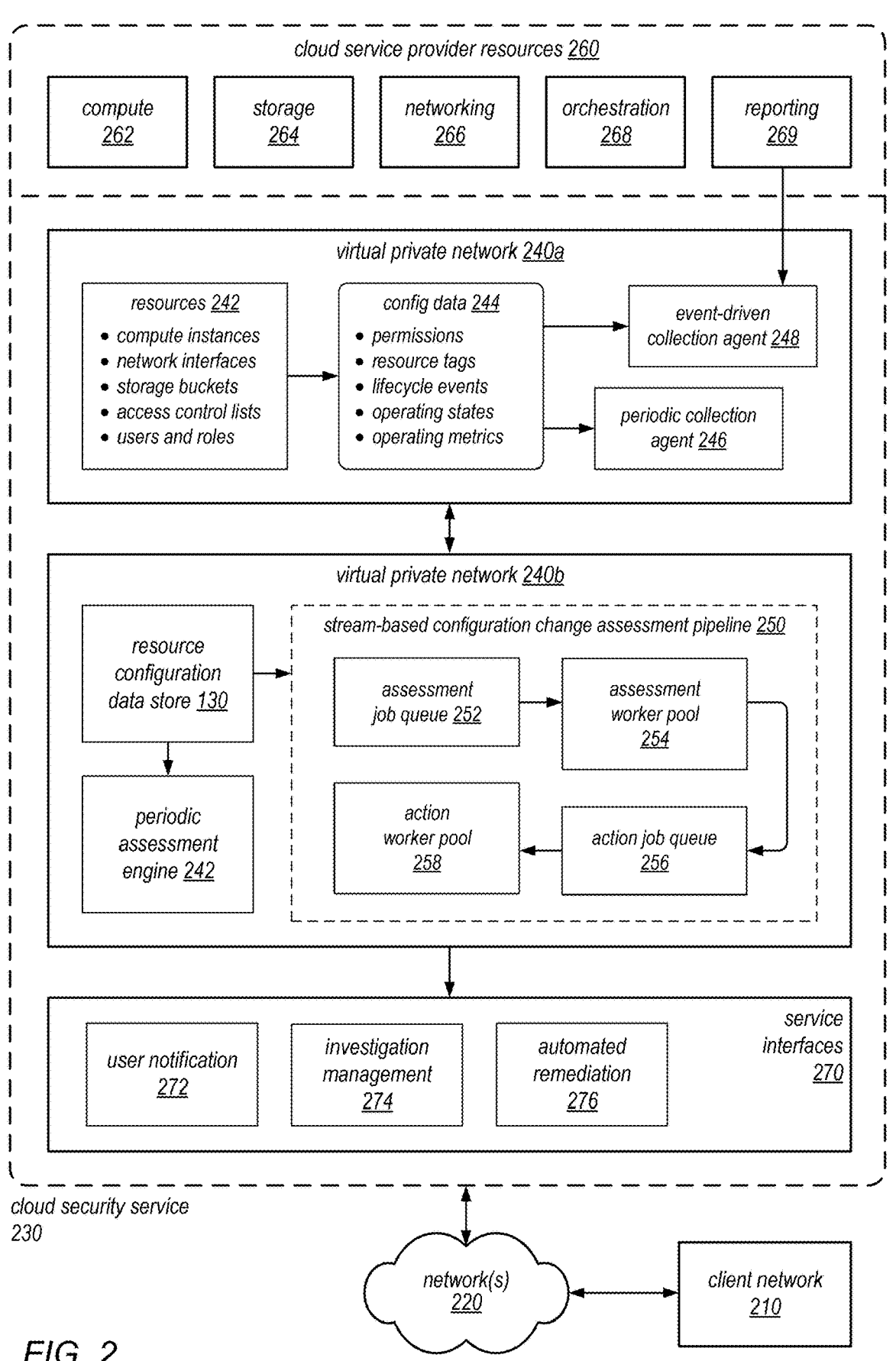
FIG. 2 is a block diagram illustrating the cloud security service implemented in a cloud service provider network and used to monitor a virtual private network hosted in the cloud service provider network, according to some embodiments.

FIG. 2 is a block diagram illustrating the cloud security service 230 implemented in a cloud service provider network and used to monitor a virtual private network 240a hosted in the cloud service provider network, according to some embodiments.

As shown in the figure, the cloud security service 230 is implemented using resources 260 provided by a cloud-based service provider. The cloud-based service provider may be a software-as-a-service (SaaS) provider, a platform-as-a-service (PaaS) provider, or an infrastructure-as-a-service (IaaS) provider. Examples of cloud-based service providers include AMAZON WEB SERVICES (AWS), MICROSOFT AZURE, GOOGLE CLOUD. In this example, an instance of the network monitoring service 120 is implemented as a cloud-based application in a virtual private network 240b hosted in the service provider network to provide client-facing cloud security services to various clients. The network monitoring service in this example is monitoring a client virtual private network 240a. The client virtual private network 240a is an embodiment of the computer network 100 of FIG. 1. It should be noted that in alternative embodiments, the network monitoring service is not hosted on the cloud service provider infrastructure. For example, in some embodiments, the network monitoring service may be run on a private network of a monitoring company, without using any virtualized resources of the cloud service provider.

As shown, in this example, the cloud service provider network may include different types of compute 262, storage 264, networking 266, orchestration 268, and reporting 269 services provided by the cloud service provider. The cloud service provider network may also provide other types of infrastructure services not shown here. Aspects of the cloud security service 230 may be built on top of the infrastructure provided by these resource services. For example, computing resources in the virtual private network 240a may include virtual machines that are instances of an emulated computer or execution environment that is hosted on a physical virtual machine host. The virtual machine host may implement virtualization hardware and/or software (e.g. hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. Another type of virtual machine is the container, which provides a portable and isolated execution environment over a host operating system of a physical host. Example implementations of container technologies include DOCKER, GOOGLE KUBERNETES, AMAZON WEB SERVICES, and MICROSOFT AZURE.

As shown, the virtual private network 240a may include other types of resources that are monitored by the network monitoring service 120. These resources may include any type of resources provided by the cloud service provider, including storage buckets or instances, different types of data storage and database management resources, compute instances such as VMs or containers, network interfaces attached to the compute instances, container orchestration resources, other virtual private networks or subnets of those networks, access control lists, users and roles, other types of identity and access management resources, AI service resources etc. In some embodiments, a security policy 150 itself may be considered a type of resource, so that any changes in the policy will be observed as a configuration change event in the input stream 162.

As shown, the monitored configuration data 244 of the resources 242 may comprise a variety of metadata about the resources. These include resource or user permissions, resource tags assigned to the resources, resource lifecycle events such as the creation and deletion of resources, resource operating states and activity logs, and resource operating metrics such as performance metrics. As discussed, any changes in this metadata 244 may be considered a configuration change event, which may trigger an event-driven partial assessment 170 of the network.

As shown in this example, the configuration data 244 may be harvested or collected in two ways, using two types of data collection agents 246 and 248. The periodic collection agent 246 is configured to collect the data 244 in periodic fashion, for example, once a day. These periodic collections may be used to generate periodic snapshots of the full configuration states of the network in the resource configuration data store 130, as discussed. The event-drive-collection agent 248, on the other hand, is configured to make more limited collections of the data 244 on an event-driven basis. Thus, for example, when a virtual machine instance is changed, the event-driven collection agent 248 may detect this change through an event-based reporting service 269 of the cloud service provider network. In response to this event, the event-driven collection agent 248 may collect configuration data 244 about the virtual machine and a limited set of related resources such as the virtual machine's attached network interfaces and storage volumes. This type of event-driven collection is used to harvest configuration data 244 from the network as changes happen, without waiting for a full collection performed by the periodic collection agent 246. Examples of cloud service provider reporting services 269 that provide event-based configuration change reporting include services such as AWS CLOUDWATCH and AZURE MONITOR.

In this example, the network monitoring service 120 of FIG. 1 is implemented in virtual private network 240*b*. As shown, this virtual private network 240*b* implements the resource configuration data store 130, a periodic assessment engine 242, and a stream-based configuration change assessment pipeline (CCAP) 250. The periodic assessment engine 242 is used to implement the periodic full assessments 140 discussed in connection with FIG. 1, and the CCAP 250 is used to implement the event-driven partial assessments 170 of FIG. 1.

As shown, the CCAP 250 in this example is implemented using an assessment job queue 252, an assessment worker pool 254, an action job queue 256 and an action worker pool 258. The job queues are used to hold jobs (either assessment jobs or action jobs) in a queue order, so that the jobs can be enqueued and dequeued for processing by worker nodes in a deterministic way. In some embodiments, the enqueue order may be different from the dequeue order. Each job on the queue may indicate the necessary information for a worker node in the pool to execute the job. For example, an assessment job in the assessment job queue 252 may indicate a particular change event that is observed in the input stream 162, including information such as the changed resource, the previous configuration state of the resource, the new configuration state of the resource, and/or a timestamp of when the change occurred. In some embodiments, the job queue 252 may implement the input stream 162. In other embodiments, the change events may be stored in a separate stream repository, and an assessment job in the job queue 252 may indicate a reference or pointer to the change events in the stream repository. In some embodiments, if multiple resource assessments are needed in response to a change event, each resource assessment may be represented as a separate assessment job on the assessment job queue 252.

The assessment worker pool 254 may comprise a pool of compute instances, for example container instances, that are configured to process jobs on the assessment job queue 252. In some embodiments, there may be only one type of container instance that is capable of handling all types of assessment jobs (e.g. assessment jobs for different types of resources). In other embodiments, some of the worker nodes may be specialized worker nodes capable of handling a specific type of assessment job. As discussed, these assessment worker nodes may be configured to write their assessment findings into an output stream 180, which may be implemented by the action job queue 256 or the same stream repository used to store the input stream 162.

The action job queue 256 may be implemented in a similar way as the assessment job queue 252, except that the action job queue 256 will hold action jobs for worker nodes in an action worker pool 258. In some embodiments, each job in the action job queue 256 will indicate an assessment finding produced by an assessment node. An assessment finding may indicate whether a particular assessment passed or failed in view of the security rules, a severity level of a pass or a security rule violation, and other contextual information such as a determined reason for a violation or an amount of time that a violation has persisted, etc.

The action worker pool 268 may be implemented in similar fashion as the assessment worker pool 258, except that the action worker pool 258 includes worker nodes (e.g. container instances) that are configured to perform actions in response to the jobs in the action job queue 256. There may be different types of action nodes for performing different types of actions. One type of action node may be configured to generate the security policy violation notifications 194 of FIG. 1. Other types of action nodes may be configured to initiate remediation actions in response to security policy violations. Examples of automated remediation actions may include logging an assessment finding to a database, generating a ticket to manage human investigation of a violation, reverting a resource to an old configuration state prior to an illegal configuration change, limiting access to one or more resources in the network 240*a* (e.g. quarantining a resource), stopping execution of one or more resources in the network (e.g. terminating a VM instance), or initiate measures for closer monitoring of one or more sources (e.g. to capture additional telemetry data that may be indicative of an ongoing attack).

In some embodiments, the queues 252 and 256 used by the CCAP 250 may be implemented using a queuing service provided by the cloud service provider. Likewise, the worker pools 254 and 256 may be implemented using a worker pool service provided by the cloud service provider. In some embodiments, these services may be configurable to employ dynamic scaling, so that the size of the queue or pool can dynamically increase or decrease based on the amount of observed demand, a predicted amount of demand, or other operating conditions of the pipeline 250. Thus, the throughput of the pipeline 250 can adjust dynamically to the rate of change events coming from the network 240*a*. In some embodiments, the components of the pipeline 250 may also be configured to perform auto-healing, so that a worker node that has failed or experience an error is automatically replaced, and a job that has failed is automatically retried (up to a specified number of attempts).

In some embodiments, the client(s) 210 of the cloud security service 230 may reside at a SOC location with analysts that are monitoring many virtual private networks of customers 240a hosted on public clouds. Client systems may use one or more service interface 270 to enable, disable, execute, or otherwise configure various features of the cloud security service 230. For example, the service interfaces 270 may include web-based graphical to provide user notification 272, security issue investigation management 274, and automated remediation 276. The user notification interface 272 may include the notification interface 190 of FIG. 1, which may be a real-time alert interface, as discussed. The investigation management interface 274 may implement various controls to allow analysts to investigate security alerts generated by the service 230, for example, to open and close tickets for investigations, to review security event logs, and to log on to the customer network 240a to perform direct evaluations of the network. The automated remediation interface 276 may be implemented as an API that can be used to invoke automated remediation actions in response to a detected security policy violation. In some embodiments, these interfaces 272, 274, and 276 may all be registered listeners of the output stream 180 of assessment findings discussed in connection with FIG. 1, so that these components are able to execute in real-time or near real-time in response to an event-driven assessment of the network 240a.

The network(s) 220 that connects the cloud security service 230 and the client network 210 may encompass any suitable combination of networking hardware and protocols necessary to establish communications between the client(s) 210 and the cloud security service 230. In some embodiments, client(s) 210 may execute in a private network of a company, behind a company firewall, and the network 210 may include a public network such as the Internet, which lies outside the firewall. The network 210 may encompass the different telecommunications networks and service providers that collectively implement the Internet. In some embodiments, the network 210 may also include private networks such as private local area networks (LANs), private wide area networks (WANs), or private wireless networks. The network 220 may be implemented using different hardware (e.g., modems, routers, switches, load balancers, proxy servers, etc.) and software (e.g., protocol stacks, accounting software, firewall/security software, etc.) for establishing networking links between client(s) 210 and the cloud security service 230.

Figure 3A:
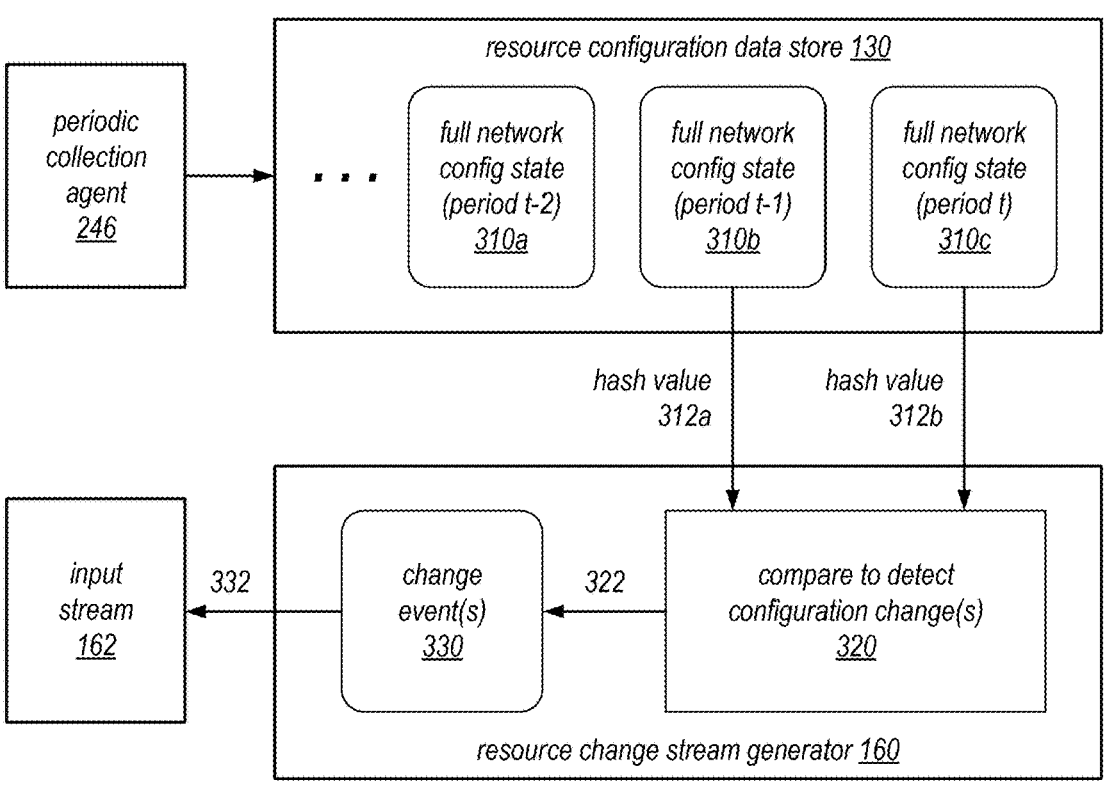
FIGS. 3A and 3B illustrate different ways of generating an input stream for a stream-based configuration change assessment pipeline (CCAP) implemented by the network monitoring service, according to some embodiments.
Figure 3B:
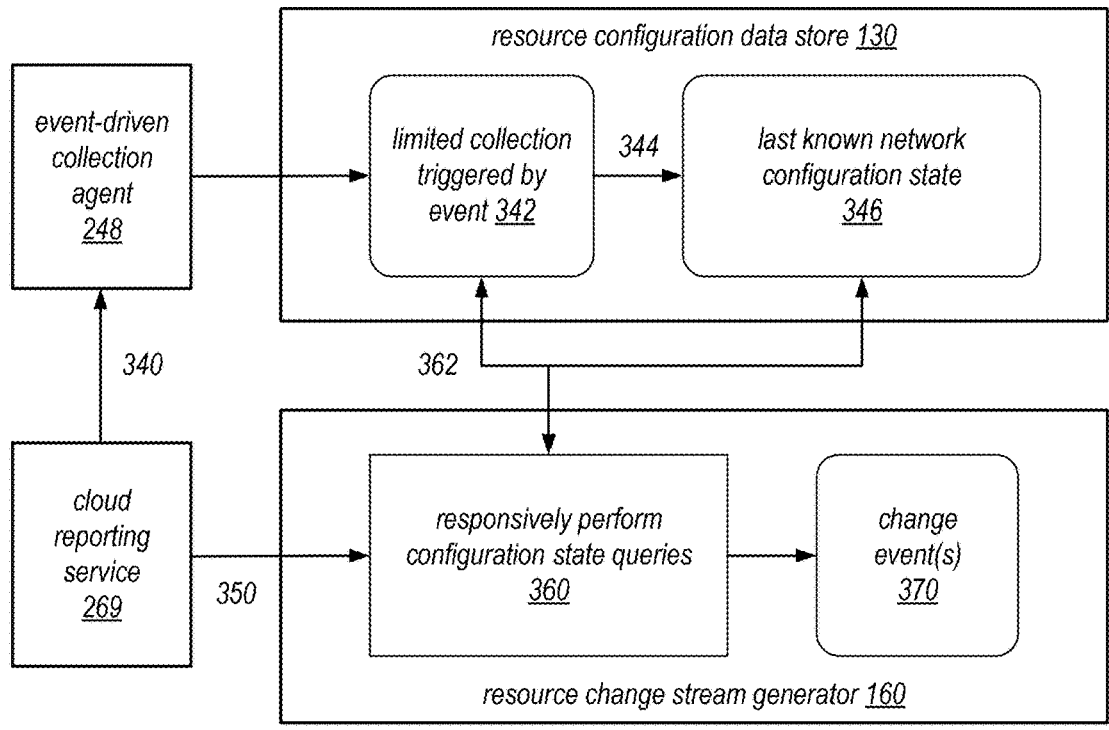

FIGS. 3A and 3B illustrate different ways of generating the input stream 162 for the stream-based configuration change assessment pipeline 250 implemented by the network monitoring service 120, according to some embodiments.

FIG. 3A depicts an embodiment of the resource change stream generator 160 of FIG. 1. In this embodiment, the stream generator 160 uses a hash comparator to compare 320 two hash values 312a and 312b associated with two successive configuration states 310b and 310c of the monitored network. Depending on the embodiment, the values used for the comparison 320 can be hash values 312, a checksum, or some other type of signature.

As shown in this example, the configuration states being compared are full configuration states 310a-c of the network collected by the periodic collection agent 246 of FIG. 2. The results of the comparison 320 are then used to generate 322 one or more change events 330 of configuration changes in the network between the two successive configuration states 310b and 310c, which are then added 332 to the input stream 162.

The generated hash values 312 will be based on all relevant attributes of the configuration state that is monitored by the network monitoring service, so any differences in the relevant attributes will change the hash value 312. In some embodiments, the comparison 320 may be performed on a resource-by-resource basis, so that the process produces a list of individual resources in the network that have changed. In some embodiments, only this list of changed resources will be reassessed by the network monitoring service for each assessment period, so that full assessments are no longer needed for each assessment period.

FIG. 3B depicts another embodiment of the resource change stream generator 160. In this embodiment, the stream generator 160 works with the event-driven collection agent 248, which is configured to perform limited collections 342 of configuration changes in the monitored network triggered by changes in the monitored network. A limited data collection 342 is then applied 344 to the last known network configuration state 346 of the network stored in the resource configuration data store 130. As discussed, the event-driven collection agent 248 may be triggered by network changes reported by a cloud reporting service 269 that is native to the cloud service provider network.

In this embodiment, the resource change stream generator 160, is also triggered 350 by the cloud reporting service 269 to perform configuration states queries of the resource configuration data store 130, so that the queries 362 may be performed as soon as the limited data collection 342 is received by the network monitoring service. In this manner, both the collection of configuration change and the generation of the change event(s) 370 are performed responsive to changes reported by the cloud reporting service 269, so that the input stream is updated as quickly as possible.

In some embodiments, the CCAP 250 may implement both types of stream generators 160, so that change events are generated both on periodic data harvests and in response to specific network changes. In some embodiments, the embodiment of the stream generator 160 in FIG. 3B does not listen to the cloud reporting service 269, but instead the event-driven collection agent 248, which may generate its own notification whenever it makes a limited collection 342. In this manner, the stream generator 160 does not need to interact with the cloud provider-specific API of the cloud reporting service 269, and can remain completely decoupled from the particularities of the cloud provider.

Figure 4:
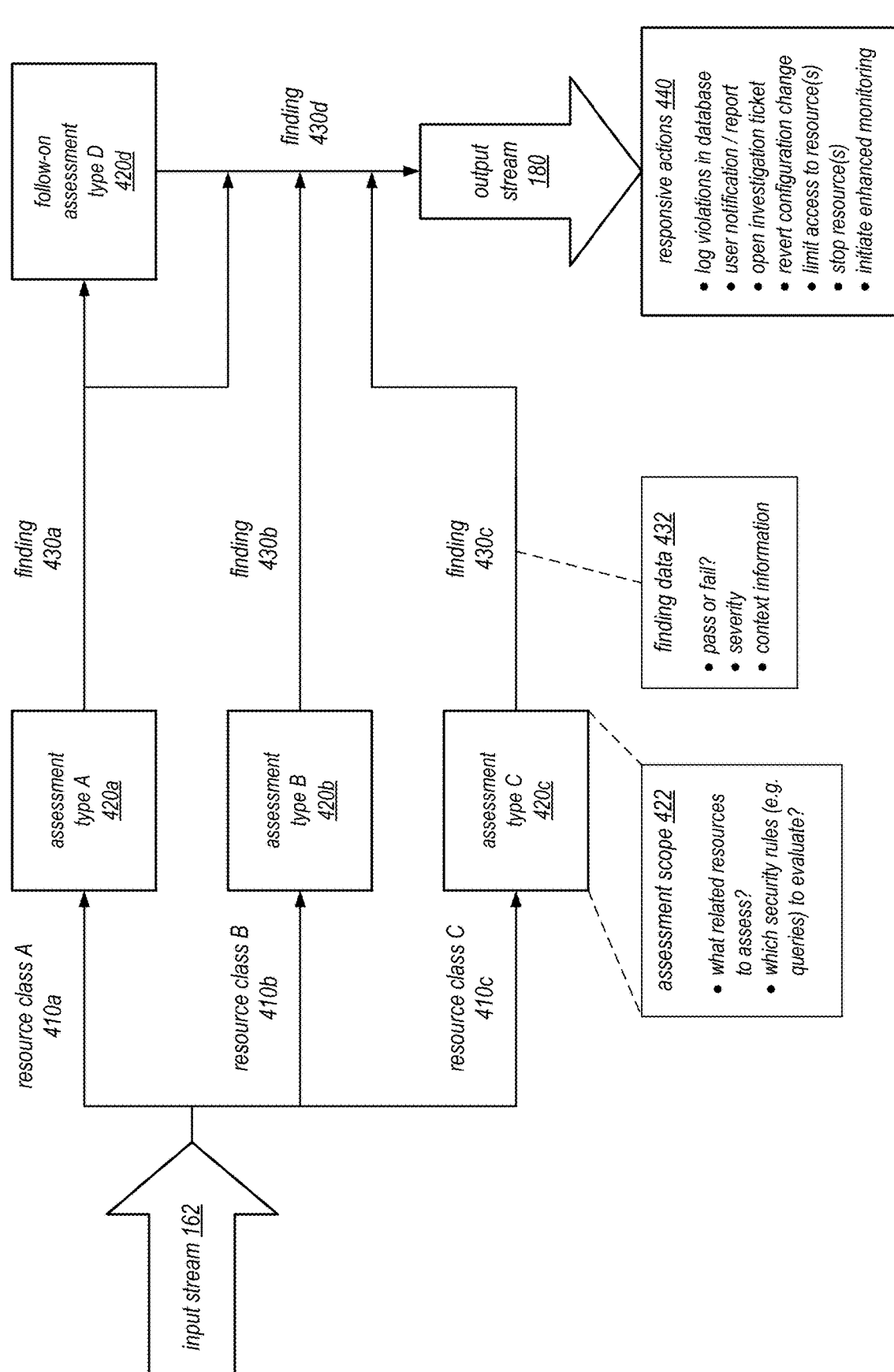
FIG. 4 illustrates operations of the CCAP to perform different types of assessments for different classes of resources and execute different types of responsive actions, according to some embodiments.

FIG. 4 illustrates operations of the CCAP 250 to perform different types of assessments for different classes of resources and execute different types of responsive actions, according to some embodiments.

As shown, in this example, the CCAP 250 implements four different types of assessments 420a-d that are triggered by change events observed in the input stream 162. In this example, assessment types A 420a, B 420b, and C 420c correspond to change events associated with different resource classes 410a-c. For example, assessment type A may be performed in response to changes in virtual machine instances, assessment type B may be performed in response to changes in storage resource instances, and assessment type C may be performed in response to changes in access control lists. In some embodiments, the different types of assessments may be performed by different types of assessment nodes or queued in different job queues. In other embodiments, different assessments 420*a-d* may be handled by the same pool of worker nodes and queued in a common job queue.

In some embodiments, the CCAP 250 may implement a type of follow-on assessment (e.g. assessment type D 420*d*), which are triggered based on the finding 430*a* of a previous assessment 420*a*. A follow-on assessment 420*d* may be performed when an earlier assessment 420*a* determines that the follow-on assessment is needed to verify the existence of the potential risk. As one example, the earlier assessment 420*a* may determine that a database storing sensitive data has exposure in a particular virtual private network, and the follow-on assessment 420*d* is performed as an added step to assess the security posture of that virtual private network, which is reported in finding 430*d*. In this manner, findings 430 generated within the CCAP 250 can be used to trigger a cascade of conditional assessments to fully evaluate all implications of a single configuration change.

In some embodiments, the findings 430 of earlier assessment nodes may be added as additional events in the input stream 162, so that assessment nodes that implement the follow-on assessment 420*d* are listening to the same input stream 162 as the earlier nodes, using the same pipeline protocol as the earlier nodes. In some embodiments, individual events in the input stream 162 may be stored as JSON documents in a time-sequenced order. An individual event may be associated with an expiration time, so that they are removed from the input stream after it exceeds a certain age.

As shown, a particular type of assessment 420*c* is associated with an assessment scope 422, which may be defined by configuration. The assessment scope 422 may specify what the particular type of assessment entails, including which related resources should be included in the assessment, and which security rules are to be evaluated for these resources. In some embodiments, a security rule may correspond to a set of queries against the configuration state data 132 of the monitored network, and the results of the queries are used to formulate the assessment findings 430*a-c*. As shown, a finding 430*c* may comprise a number of data items, including a Boolean value indicating whether the assessment was a pass or a failure, a severity measure or indicator of a violation (e.g. a significance or likelihood of the violation), and other contextual information such as reason(s) for the assessment finding, etc.

As shown, in some embodiments, all of the assessment findings 430*a-d* generated by the CCAP 250 are added to the output stream 180. In some embodiments, the output stream 180 and the input stream 162 may be the same stream. In some embodiments, the two streams 162 and 180 may be different streams but stored in the same stream data repository.

As discussed, in various embodiments, the output stream 180 is monitored by action node components that are configured to perform various type of responsive actions 440 in response to the assessment findings reported in the output stream. As shown, these responsive actions may include logging the findings or violations in a database, surfacing a detection violation in a user notification or report, opening investigation tickets for analysts to investigate a detected violation or security issue, automatically reverting a configuration change that caused the security violation, automatically limiting access to one or more resources affected by the security violation, automatically stopping one or more resources affected by the security violation, and/or initiating enhanced or closer monitoring of resources in response to a detected violation. In some embodiments, the enhanced monitoring may cause the data collection agents to

246 and 248 to begin collecting additional types of information about the resources to be reported via the input stream 162.

Figure 5:
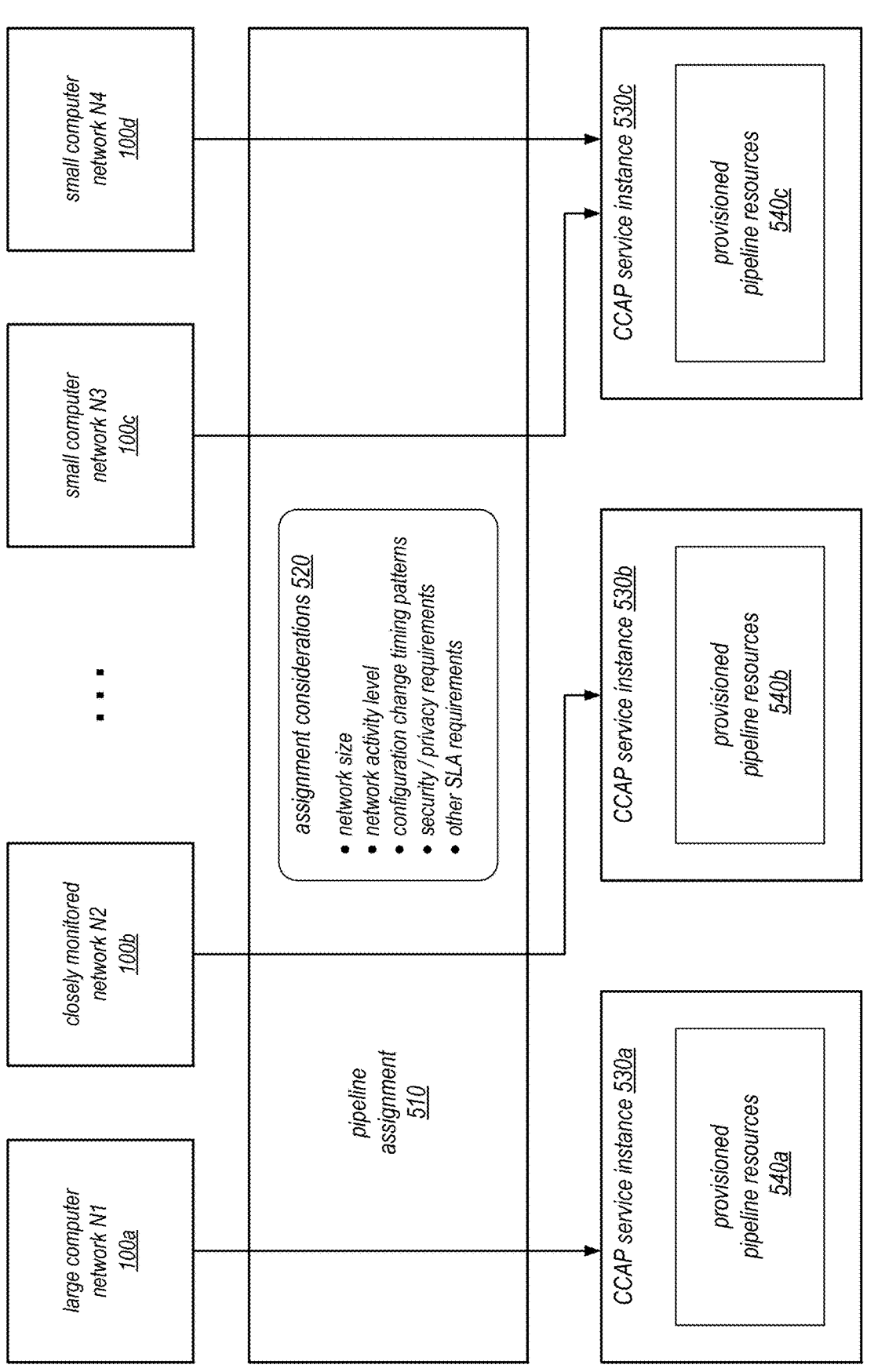
FIG. 5 illustrates an assignment component that assigns networks to different service instances of the CCAP for monitoring, according to some embodiments.

FIG. 5 illustrates an assignment component 510 that assigns networks 100*a-d* to different service instances 530*a-c* of the CCAP for monitoring, according to some embodiments.

As shown, in some embodiments, the network monitoring service 120 may operate multiple CCAP services instances 530*a-c* with their own provisioned pipeline resources 540*a-c*, so that these instances can execute in parallel to monitor different networks 110*a-d*. In such embodiments, a single CCAP service 530 instance can be assigned to monitor and track configuration data for multiple computer networks 100, so that the one CCAP service instance is multi-tenant in terms of the computer networks that it monitors. In such embodiments, the pipeline assignment component 510 is tasked with selecting a CCAP pipeline instance 530 to monitor a computer network 100, based on a set of assignment considerations or factors 520.

The pipeline assignment component 510 may be configured to make an initial assignment decision when network monitoring is first requested by the user. Moreover, in some embodiments, the pipeline assignment component 510 automatically reassigns networks to different CCAP service instances 530 based on subsequent evaluations. A reassignment may entail copying the historical configuration data of the network from one pipeline instance to another, and then updating a data routing component in the service to route harvested data from the network to the new pipeline instance. These reassignments may be performed without any performance impacts to the user, and may be triggered based on configured thresholds such as pipeline performance thresholds (e.g. alert times or change event backlogs).

As shown, in some embodiments, the size of the monitored network (e.g. in terms of asset count) may be a factor in selecting a CCAP service instance. For example, a smaller network may be assigned to a CCAP service instance with fewer pipeline resources, while a larger network 100*a* is assigned to a larger CCAP service instance. As shown in this example, two smaller networks N3 100*c* and N4 100*d* may be assigned to the same CCAP service instance 530*c* in a multi-tenant arrangement, where the CCAP service instance 530*c* is determined to have sufficient capacity to monitor both networks N3 and N4 at the same time. Sharing of the pipeline instance in this manner can improve resource utilization in the network monitoring service, particularly when the networks N3 and N4 generate change events in non-overlapping time periods (e.g. network N3 generates most changes on Wednesday and network N3 generates most changes on Saturday). Thus, as shown, the configuration change timing patterns of the monitored networks is another consideration 520 when assigning the networks to pipeline instances.

In some embodiments, the assignment process may take into account certain security and/or privacy requirements of the network owner. For example, if a network N2 100*b* must be closely monitored according to its SLA (e.g. guaranteed to report any security violations within a specified period of time), network N2 may be assigned to a CCAP service instance 530*b* that is specifically resourced and configured to meet those SLA requirements. Another type of requirement that may impact pipeline assignment is the level of data privacy required by the network owner. Even though the input streams 162 and configuration data stores 130 of two monitored networks can be kept separate within a single pipeline instance, certain clients may wish to limit its network metadata to an isolated pipeline instance so that the data cannot be leaked (either accidentally or maliciously) via the reporting for another network.

In various embodiments, the pipeline assignment component 510 may take all of these factors or considerations 520 into account to make its assignment decisions. In some embodiments, the assignment decision may be made based on a weighted balance of a combination of factors. In some embodiments, the pipeline assignment component 530 may also be responsible for creating new pipeline instances when they are needed and retiring current pipeline instances when they are no longer needed.

Figure 6:
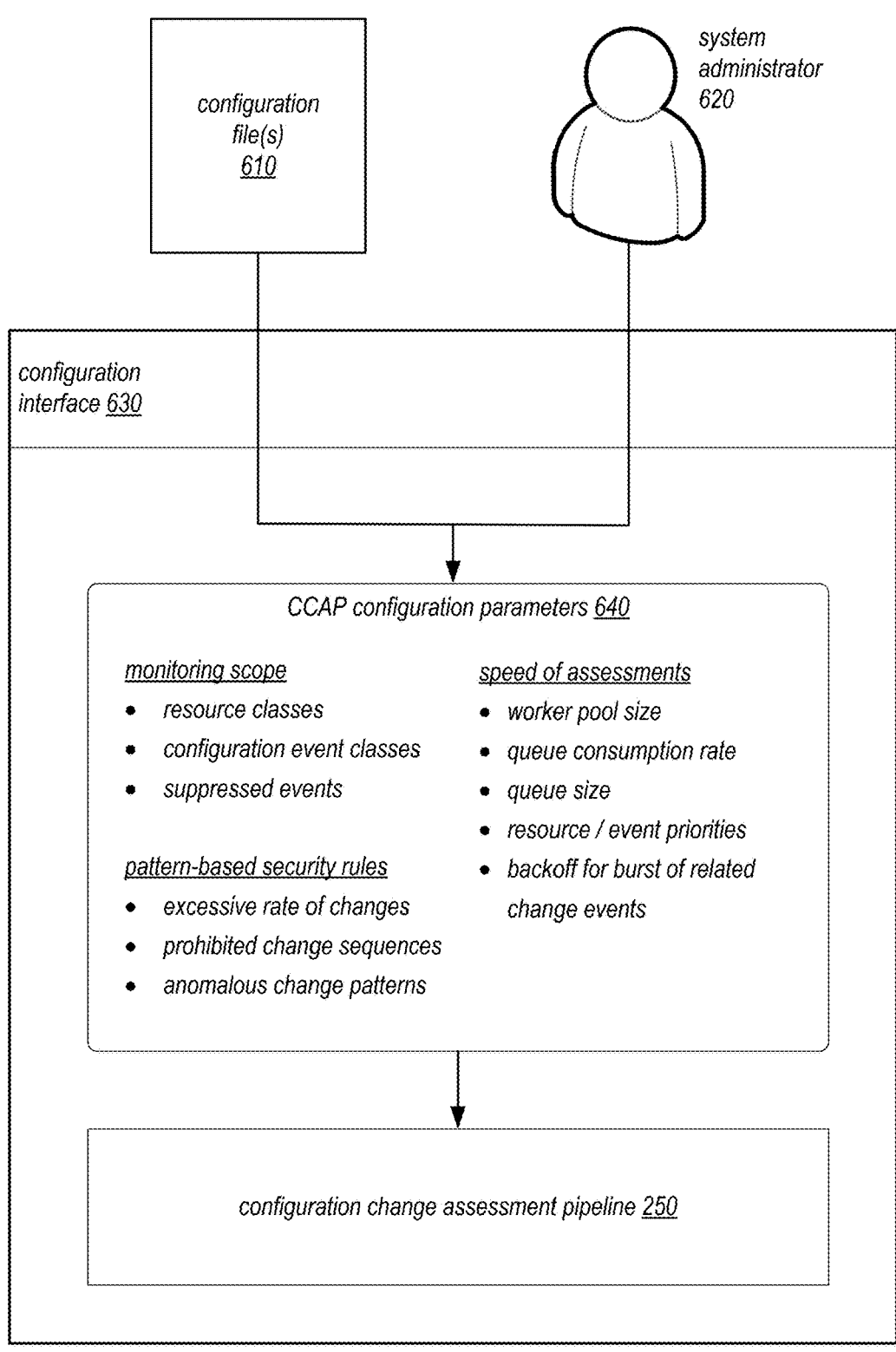
FIG. 6 illustrates different types of configuration parameters of the CCAP that may be exposed by the network monitoring service, according to some embodiments.

FIG. 6 illustrates different types of configuration parameters 640 of the CCAP 250 that may be exposed by the network monitoring service 120, according to some embodiments.

As shown, embodiments of the network monitoring service 120 may provide a configuration interface 630 that allows various configuration parameters 640 of the CCAP 250 to be changed. The configuration interface 630 may be a programmatic interface (e.g. an API that consumes a configuration file 610), a user interface (e.g. a GUI that allows a system administrator 620 to specify the configuration parameters), or a combination of both.

As shown, one category of configuration parameters may control the overall monitoring scope of the CCAP 250. For example, such parameters may allow users to specify which resource classes are or are not monitored by the pipeline (e.g. only compute instances with a particular resource tag). As another example, a monitoring scope parameter may specify that certain types of configuration change events should or should not be placed in the input stream 162. As yet another example, the monitoring scope parameters may explicitly suppress certain categories of configuration change events (e.g. events generated during a network upgrade window where a large number of network changes are being deployed). In some embodiments, suppressed events are not observed by the CCAP 250 and thus no partial assessments can be triggered.

Additionally, because configuration change events are observed by the CCAP 250 as a near real-time event stream, the CCAP 250 is in a position to make certain time-based assessments of the changes based on a set of pattern-based security rules. For example, the CCAP may be configured to raise an alert when the rate or frequency of configuration changes in the network is excessive (e.g. exceeds a frequency threshold). As another example, the rate of frequency of changes may be gauged for each data harvesting period (e.g. used by the periodic collection agent 246). If a particular category of configuration changes exceeds a specified change rate, the CCAP may generate an alert and/or enable event-driven harvesting or partial assessments for that category of configuration changes. As a final example, the CCAP may be configured to recognize anomalous or suspicious patterns of configuration changes in the network. These patterns may be specified based on user-specified rules (e.g. a sequence administrator permission grants), learned via machine learning (e.g. similar sequences of changes in the past frequently caused actual security violations in the monitor network).

Finally, as shown, some of the CCAP configuration parameters may be used to control the speed of assessments (and resource usage) in the pipeline (e.g. how quickly assessments are carried out for change events). These parameters may include the size of worker pools (e.g. worker pools 254 and 258), the queue consumption rate of job queues (e.g. job queues 252 and 256), the size of the job queues, etc. In some embodiments, if incoming change events overflow a job queue, the additional events are dropped or throttled. A dropped or throttled change event will not trigger any partial assessments of the network in the CCAP; however, the change may still be assessed as part of a later full assessment performed periodically. In some embodiments, the backlog or overflow rate of job queues may be recorded as performance metrics of the CCAP pipeline. These performance metrics may be used by the system to make dynamic adjustments to the CCAP to meet the changing resource demands of the pipeline.

As shown, another type of speed parameter that can be specified via the configuration interface is a priority setting for different types or classes of resources or events in the network. A higher priority value for a resource or event class causes the CCAP to, for example, generate alerts for these types of events more quickly (possibly before prior events in the input stream), or avoid throttling of these events.

As shown, yet another type of speed parameter can be configured for the CCAP is a backoff parameter that specifies to temporarily refrain from performing any assessments on a burst of related events observed in a short period of time. This backoff parameter allows the CCAP to avoid repeatedly performing unnecessary assessments for a rapid sequence of configuration changes that do not need to be assessed individually (e.g. two resource changes that will trigger the same partial assessment, a switching back and forth of a configuration setting). This way, the CCAP does not waste computation cycles on these types of changes. In some embodiments, the backoff is triggered based on a configured frequency threshold for a burst of configuration changes occurring within a specified time duration.

FIG. 7 is a flowchart illustrating the operations of the CCAP 250 to assess configuration changes in a monitored network and perform responsive actions, according to some embodiments.

The process begins at operation 710, where the CCAP 250 receives an input stream 162 of change events that indicates configuration changes of resources 102 in a monitored computer network 100. In some embodiments, the monitored network is a virtual network (e.g. virtual private network 240*a*) hosted on a cloud service provider network, and the CCAP 250 may be implemented as part of a network monitoring service 120, which may also be partly implemented on the cloud service provider network. The CCAP 250 may operate to provide event-driven partial assessments 170 of configuration changes in the network 100, which may execute alongside a period assessment engine 242 that performs periodic full assessments 140 *o* of the configuration state of the network. The input stream 162 may be generated by a report service 269 of the cloud service provider, or built by a resource change stream generator component 160 that is part of the network monitoring service 120.

As shown, operations 730 to 770 are performed 720 by a pool of assessment nodes 254 configured to monitor the input stream. At operation 730, an assessment node detects a change event of a resource in the input stream. The resource may be any type of resource 242 in the network discussed in connection with FIG. 2, and the change may be associated with any type of configuration data 244 of the resource, discussed in connection with FIG. 2. In some embodiments, the change event may be queued as an assessment job in a job queue and dequeued by the assessment node.

At operation 740, the assessment node identifies a set of resources, including the resource changed by the change event, to be assessed for security policy violation(s) as a result of the configuration change. The set of resources are resources that affect a set of security rules that must be reassessed as result of the configuration change. In some embodiments, the set of security rules are first identified based on the resource and the change event, and additional resources evaluated by the security rules are also assessed.

At operation 750, assessments are performed for the resources in the identified set for security policy violation(s), based on the configuration states of the resources. In some embodiments, the assessment of a resource may take into account both a prior state of a resource before the change and the new state of the resource after the change. In some embodiments, individual assessments may be performed by different assessment nodes.

At operation 760, the CCAP determines, based on the assessments, a finding that the configuration change causes a security policy violation. In some embodiments, an assessment may comprise performing queries against the configuration state data 132 of the resources, whose results will be used to formulate the assessment finding 430. In some embodiments, multiple resource assessment findings are combined logically to determine an overall finding for a particular security risk. As one example, the assessments may be performed for a changed virtual machine instance, its attached network instances, and access control lists of virtual networks and subnets associated with the network interfaces. The findings of these assessments may be used to make an overall determination of whether the virtual machine instance is publicly accessible from the Internet (a security policy violation).

At operation 760, the assessment node (or another component in the CCAP) writes the finding to an output stream 180. In some embodiments, the output stream may be the same stream as the input stream 162. In some embodiments, the input stream and output stream may be two different streams but stored in the same stream repository (or using the same storage system). As shown, the assessment process 720 performed by the pool of assessment nodes may execute continuously to process change events in the input stream.

As shown, operation 790 is performed by a pool of action nodes 258 that monitors the output stream 180. At operation 790, an action node receives the finding of security policy violation in the network and performs one or more actions in response to the finding. In some embodiments, the responsive action may be to generate a user notification 194 that the configuration change causes a security policy violation. The user notification may be presented via different types of user interfaces such as a GUI, an email, or an instant message. In various embodiments, the output stream 180 may be monitored by a variety of actions nodes that are configured to perform different types of actions 440 in response to different types of findings, as discussed in connection with FIG. 4. Advantageously, because the CCAP 250 is designed to trigger responsive actions based on individual configuration changes in an ad hoc manner, the pipeline is able to report security policy violations much more quickly than the periodic full assessments 140 periodically performed on the monitored network, and using much less assessment resources.

FIG. 8 is a flowchart illustrating a process of generating an input stream 162 for the CCAP 250 using data in a resource configuration database 130, according to some embodiments. In some embodiments, parts of the depicted process is performed by the resource change stream generator 160 discussed in connection with FIGS. 1, 3A, and/or 3B.

The process starts at operation 810, data collection agents (e.g. agent 110) are executed in the monitored computer network 100 to collect configuration states of resources 102 in the network. As discussed in connection with FIG. 2, the data collection agents may include periodic collect agents 246 that collect configuration data on a periodic basis and event-driven collection agents 248 that make more limited collections of the configuration data on an event-driven basis.

At operation 820, the collected data is stored in a database (e.g. resource configuration data store 130) as successive configuration states of the resources of the network. Depending on the embodiment, the successive configuration states may be full snapshots of the configuration state of the network or partial snapshots of only a subset of the resources at a particular time.

At operation 830, the network monitoring service 120 receives a new configuration state of a resource collected by one or more data collection agents 110 in the computer network. Depending on the type of data collection agent, the new configuration state may be received as part of a full data collection of the network performed by a periodic collection agent 246 or a more limited data collection performed by an event-driven collection agent 248. The collected data may be received through a data receiving interface 122 of the network monitoring service 120, as discussed in connection with FIG. 1.

At operation 840, the resource change stream generator 160 generates two hash values for two configuration states of a resource stored in the resource configuration data store 130: a first hash value for the new configuration state and a second hash value for an old configuration state. Because these hashes are generated based on attributes of the configuration state data, any changes in the configuration state data will cause the two hash values to be different. At operation 850, the resource change stream generator 160 compares the two hash values to determine that the resource has experienced a configuration change. In some embodiments, operations 840 and 850 may be repeated for all resources in the network to determine a list of changed resources in the network since a last assessment.

At operation 860, the resource change stream generator 160 adds a change event indicating the resource change to an event stream (e.g. the input stream 162 consumed by the CCAP 250). In some embodiments, the change event will indicate the resource that experienced the change, a time of the configuration change, the old configuration state of the resource, and the new configuration state of the resource. If multiple changed resources are identified, a separate change event may be generated for each changed resource and added to the event stream.

Finally, as shown, the event stream is monitored and processed by the pool of assessment nodes at operation 720, as discussed in connection with FIG. 7. As discussed, by building the input stream 162 internally within the network monitoring service 120, the service decouples its data schema from the schema of the cloud service providers, allowing the service to be evolved independently from the cloud service provider APIs and work with multiple cloud service provider platforms. Additionally, a self-built input stream 162 allows the network monitoring service to achieve better control over how input data is consumed by the pipeline, to enable features such as customized data filters and throughput controls.

Figure 9:
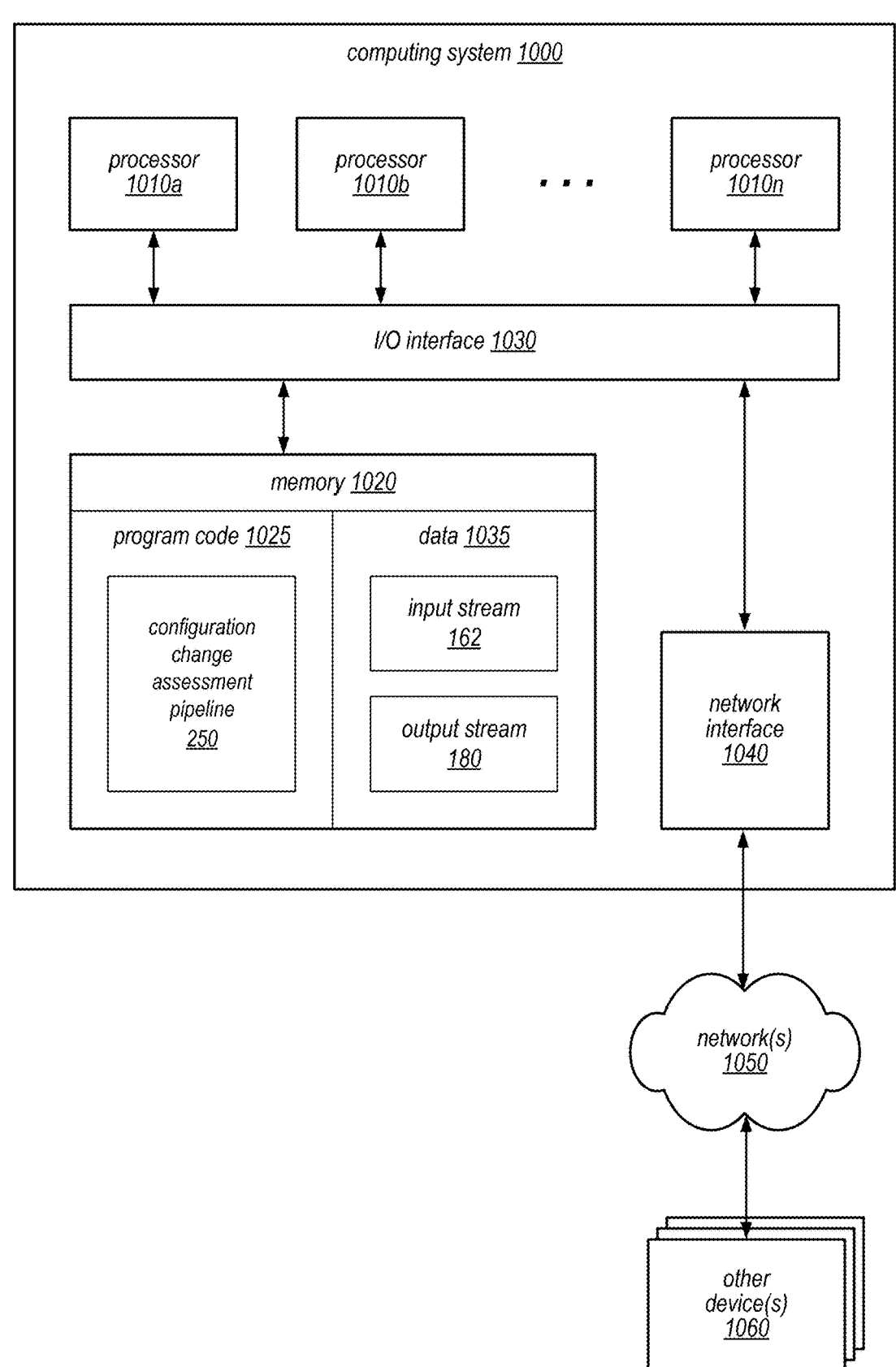
FIG. 9 is a block diagram illustrating an example computer system that can be used to implement one or more portions of the CCAP, according to some embodiments.

FIG. 9 is a block diagram illustrating an example computer system that can be used to implement one or more portions of the CCAP 250, according to some embodiments.

For example, the computer system 1000 may be a server that implements one or more components of the network monitoring service 120 of FIG. 1. In some embodiments, the computer system 1000 may be used to implement one or more components of the cloud security service 230 of FIG. 2.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010$a$-$n$, as shown. The processors 1010 may be any suitable processors capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may include instructions to implement the functionality of the CCAP 250, as discussed. The system memory 1020 may also be used to store data 1026 needed or produced by the executable instructions. For example, the in-memory data 1026 may include data of the input stream 162 and the output stream 180, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A system, comprising:

one or more computing devices configured to implement a configuration change assessment pipeline (CCAP), configured to:

store, in a database, respective configuration states of a plurality of resources of a computer network;

receive, from the computer network, a new configuration state of a resource;

compare the new configuration state of the resource with an old configuration state of the resource stored in the database to determine that the resource has experienced a configuration change;

add, to an event stream, a change event indicating the configuration change, wherein the change event indicates the resource that experienced the configuration change, a time of the configuration change, the old configuration state, and the new configuration state;

monitor the event stream for security policy violations in the computer network caused by configuration changes in the computer network;

add, to an output stream, a finding that a security policy violation is caused by the configuration change of the resource; and generate, based on the finding, a user notification of the change event and the security policy violation.

2. The system of claim 1, wherein to compare the new configuration state of the resource with an old configuration state of the resource, the CCAP is configured to compare a first hash value of the new configuration state and a second hash value of the old configuration state.

3. The system of claim 1, wherein the old and new configuration states of the resource indicate one or more of a permission of the resource, a permission associated with the resource, a tag assigned to the resource, an operating state of the resource, or a metric of the resource.

4. The system of claim 1, wherein:

the CCAP is configured to perform periodic collections of configuration data from the computer network according to a periodic schedule;

the old configuration state is collected during an earlier one of the periodic collections; and the new configuration state is collected during a later one of the periodic collections.

5. The system of claim 1, wherein:

the computer network is a first virtual network of virtual machine instances hosted on a cloud service provider network; and the CCAP is implemented in a second virtual network hosted on the cloud service provider network.

6. The system of claim 5, wherein:

the CCAP is configured to perform event-driven collections of configuration data from the computer network based on events generated an event reporting service of the cloud service provider network; and the new configuration state is collected during an event-driven collection of configuration data triggered by an event reported by the event reporting service.

7. The system of claim 6, wherein the CCAP is configured to perform event-driven collections of configuration data from virtual networks hosted by different types of cloud service provider networks, based on events generated by different types of event reporting services.

8. The system of claim 1, wherein:

the CCAP executes a plurality of assessment nodes in a worker pool to monitor the event stream;

change events in the event stream are placed in a work queue as assessment jobs; and the assessment nodes in the worker pool retrieve the assessment jobs from the work queue according to a queue order.

9. The system of claim 8, wherein the CCAP is configured to dynamically adjust a size of the worker pool based on an expected frequency of change events in a next time period.

10. The system of claim 1, wherein the CCAP is configured to perform different actions in response to the finding in the output stream, including one or more of:

logging the finding to a database;

generating a ticket for human investigation of the finding;

reverting the resource to an old configuration state;

limiting access to the resource; or stopping execution of the resource.

11. A method, comprising:

executing one or more computing devices of a configuration change assessment pipeline (CCAP), including:

storing, in a database, respective configuration states of a plurality of resources of a computer network;

receiving, from the computer network, a new configuration state of a resource;

comparing the new configuration state of the resource with an old configuration state of the resource stored in the database to determine that the resource has experienced a configuration change;

adding, to an event stream, a change event indicating the configuration change, wherein the change event indicates the resource that experienced the configuration change, a time of the configuration change, the old configuration state, and the new configuration state;

monitoring the event stream for security policy violations in the computer network caused by configuration changes in the computer network;

adding, to an output stream, a finding that a security policy violation is caused by the configuration change of the resource; and generating, based on the finding, a user notification of the change event and the security policy violation.

12. The method of claim 11, wherein comparing the new configuration state of the resource with an old configuration state of the resource comprises comparing a first hash value of the new configuration state and a second hash value of the old configuration state.

13. The method of claim 11, wherein:

the CCAP is configured to perform periodic collections of configuration data from the computer network according to a periodic schedule;

the old configuration state is collected during an earlier one of the periodic collections; and the new configuration state is collected during a later one of the periodic collections.

14. The method of claim 11, wherein:

the CCAP is configured to perform event-driven collections of configuration data from the computer network based on events generated an event reporting service executing in the computer network; and the new configuration state is collected during an event-driven collection of configuration data triggered by an event reported by the event reporting service.

15. The method of claim 11, further comprising:

receiving, via a configuration interface of the CCAP, one or more configuration parameters that control one or more operation behaviors of the CCAP, including one or more configuration parameters that control how quickly change events in the output stream are assessed for security policy violations.

16. The method of claim 15, wherein:

the CCAP classifies the resources of the computer network into a plurality of resource classes;

the configuration parameters specify different priorities for different resource classes; and the different priorities affect how quickly change events are assessed for the different resource classes.

17. The method of claim 15, wherein the configuration parameters specify to suppress assessments for one or more resources in the computer network.

18. The method of claim 15, further comprising the CCAP:

observing a burst of change events in the event stream that would cause repeated performance of an assessment, and in response:

delaying the assessment until after the burst has ended.

19. The method of claim 18, wherein the burst of change events includes two or more change events that switch a configuration back and forth.

20. The method of claim 15, further comprising the CCAP:

determining that a particular security policy violation has occurred based on a determination that a particular type of change event exceeds a frequency threshold.

\*  \*  \*  \*  \*